US010286882B2

United States Patent
Mathissen et al.

(10) Patent No.: US 10,286,882 B2
(45) Date of Patent: May 14, 2019

(54) MOTOR VEHICLE WITH DUST COLLECTOR

(71) Applicant: FORD GLOBAL TECHNOLOGIES, LLC, Dearborn, MI (US)

(72) Inventors: Marcel Mathissen, Würselen (DE); Rainer Vogt, Aachen (DE); Volker Scheer, Roetgen (DE); Lothar Krueger, Much (DE)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 15/406,875

(22) Filed: Jan. 16, 2017

(65) Prior Publication Data

US 2017/0210354 A1 Jul. 27, 2017

(30) Foreign Application Priority Data

Jan. 22, 2016 (DE) .................. 10 2016 200 936

(51) Int. Cl.
*B60S 3/04* (2006.01)
*B01D 45/12* (2006.01)
*B01D 46/00* (2006.01)
*B03C 3/00* (2006.01)
*B60R 19/00* (2006.01)
(Continued)

(52) U.S. Cl.
CPC ............... *B60S 3/04* (2013.01); *B01D 45/12* (2013.01); *B01D 46/0002* (2013.01); *B03C 3/00* (2013.01); *B03C 3/41* (2013.01); *B03C 3/45* (2013.01); *B60R 19/00* (2013.01); *B03C 2201/30* (2013.01); *B60R 2019/002* (2013.01)

(58) Field of Classification Search
CPC ...... B01D 45/12; B01D 46/0002; B03C 3/00; B03C 3/41; B03C 3/45; B03C 2201/30; B60R 19/00; B60R 2019/002; B60S 3/04
See application file for complete search history.

(56) References Cited

U.S. PATENT DOCUMENTS 6,401,520 B1 6/2002 Volkwein et al.
6,592,642 B2 7/2003 Maricq et al.
(Continued)

FOREIGN PATENT DOCUMENTS

CN 2052369 U 2/1990
DE 10329931 A1 2/2005
(Continued)

OTHER PUBLICATIONS

English Machine Translation of CN2052369U.
English Machine Translation of JP2008302803A.
English Machine Translation of KR101511663B1.
English Machine Translation of DE202007000246U1.
English Machine Translation of DE10329931A1.
(Continued)

*Primary Examiner* — Mussa A Shaawat
(74) *Attorney, Agent, or Firm* — Jason Rogers; Vichit Chea; King & Schickli, PLLC

(57) ABSTRACT

A motor vehicle includes at least one air-conducting structure. That at least one air conducting structure is arranged downstream of a vehicle wheel in the direction of travel, for conducting at least some of the air in a wake of the vehicle wheel to a dust collector. A control unit is provided for automatic adjustment, in a manner depending on the speed of travel of the vehicle and/or of the spacing between a lower edge of the air-conducting structure and a roadway surface being driven over by the vehicle.

20 Claims, 2 Drawing Sheets

Figure 1:
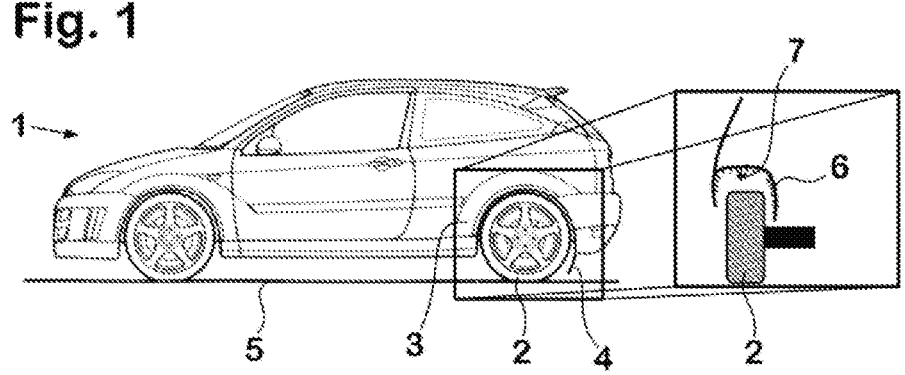

(51) Int. Cl.
B03C 3/41 (2006.01)
B03C 3/45 (2006.01)

(56) References Cited

U.S. PATENT DOCUMENTS

| | | |
|---|---|---|
| 8,167,098 B2 | 5/2012 | Jessberger |
| 2014/0054119 A1* | 2/2014 | Hummel ............ F16D 65/0031 188/218 A |
| 2014/0054120 A1* | 2/2014 | Hummel ............ F16D 65/0031 188/218 A |
| 2014/0054121 A1* | 2/2014 | Hummel ............ F16D 65/0031 188/218 A |

FOREIGN PATENT DOCUMENTS

| | | |
|---|---|---|
| DE | 202005005673 U1 | 9/2005 |
| DE | 202006004522 U1 | 6/2006 |
| DE | 202006019335 U1 | 4/2008 |
| DE | 202007000246 U1 | 5/2008 |
| JP | 2008302803 A | 12/2008 |
| KR | 101511663 B1 | 4/2015 |

OTHER PUBLICATIONS

English Machine Translation of DE202006019335U1.
English Machine Translation of DE202006004522U1.
English Machine Translation of DE202005005673U1.

* cited by examiner

MOTOR VEHICLE WITH DUST COLLECTOR

TECHNICAL FIELD

This document relates to a motor vehicle with at least one air-conducting structure, arranged downstream of a vehicle wheel in the direction of travel, for conducting at least some of the air in the wake of the vehicle wheel to a dust collector.

BACKGROUND

Traffic-related particle emissions that result not from exhaust gases but rather from abrasion of brakes, tires, clutches, roadway paving etc., and also from re-whirling of road dust, contribute considerably to air pollution. It is expected that exhaust-gas particle emissions will decrease by reason of strict limits, but the other traffic-related particle emissions will increase by reason of greater traffic volume, and could become a focal point of future regulations. Data from the Deutsches Umweltbundesamt [German Federal Environment Agency] give cause to expect that exhaust-gas particle emissions in the year 2020 will make up about 18% of all traffic-related fine-dust emissions, in which connection the term "fine dust" denotes the particles having aerodynamic diameters of less than 10 µm. The remaining 82% are emissions caused not by exhaust gas but rather by wear. This shows the increasing importance of the particle emissions not caused by exhaust gas.

For the purpose of reducing brake-dust emissions especially, techniques are known such as, for example, shielding arrangements, blowers and dust collectors. For instance, DE 20 2007 000 246 U1 discloses a brake-dust collector in which a fan generates a stream of air which transports brake dust that has arisen to a filter element. The filter element may be of electrostatic construction, in order to assist it by electrostatic accretion of dust particles. The fan blades may be constituted by rim spokes.

DE 10 329 961 A1 discloses an integrated fine-dust suction apparatus for vehicles, with which fine dusts can be filtered out of the ambient air and collected for scientific investigations. The fine dusts can also be analyzed during the collecting process with an aerosol spectrometer by way of dust-measuring instrument, in which case the measured data can be relayed by radio.

Motor vehicles have also already been proposed with which the ambient air is to be cleansed of fine dusts during a run.

For instance, DE 20 2006 019 335 U1 discloses a fine-dust suction apparatus for vehicles, with which the fresh air supplied to the passenger compartment of the vehicle can be cleansed of fine dusts, but with which the fine-dust content in the ambient air can also be reduced, in order to comply with legally prescribed fine-dust limits.

DE 20 2006 004 522 U1 discloses a fine-dust filter operating with electrical or magnetic separation. The fine-dust filter is arranged between the air-inlet grille and the radiator of a vehicle in order to cleanse the ambient air, flowing through there, of fine dusts, including fine dusts which have been emitted or whirled up by other vehicles.

DE 20 2005 005 673 U1 discloses an outside-air filter for motor vehicles, mounted beneath a fender, for general reduction of air pollution.

Systems of such a type could only reduce fine dust in the environment effectively if they were installed in a very large number of vehicles, and the expenditure for cleaning the many filters and for disposing of the collected dusts would be extreme, especially since comparatively coarse dusts, which are not really harmful, would also be collected, and the filters would quickly become full.

Motor vehicles have also already been proposed that make it possible to collect more selectively the dusts emitted or whirled up by a motor vehicle itself.

For instance, KR 101 511 663 B1 discloses a motor vehicle with a duct extending within the wheel housing, which during a run takes up air which is laden with dust that has been whirled up, and conveys it through a dust filter.

JP 2008 302 803 A discloses a dust collector for dust whirled up by a motor vehicle, wherein an air-inlet opening is situated downstream of a vehicle wheel, from which air laden with dust is conveyed by a fan into a dust-collecting bag via a duct.

CN 2 052 369 U discloses a motor vehicle having a dust-trap, arranged downstream of a vehicle wheel, with an air-inlet opening situated underneath, into which air which is laden with dust that has been detached from the wheel enters automatically during a run. In the event of rain or humidity, the air-inlet opening is capable of being closed with a flap. At its upper end the dust-trap has an air outlet which is connected to a passive dust collector such as a vortex separator.

Advantageously, a motor vehicle equipped with the dust collector disclosed in this document collects the dusts emitted or whirled up by the motor vehicle itself—that is to say, dusts resulting from abrasion of brakes, tires, clutches, roadway paving etc. and also from re-whirling of road dust—particularly selectively.

This object is achieved by a motor vehicle having the features disclosed herein.

SUMMARY

In accordance with the purposes and benefits set forth herein, a motor vehicle includes a device for automatic adjustment, in a manner depending on the speed of travel of the vehicle, of the spacing between a lower edge of the air-conducting structure and a roadway surface being driven over by the vehicle. This makes it possible to restrict the collection of dust to situations in which the motor vehicle is emitting or whirling up, to an appreciable extent, dust resulting from abrasion of brakes, tires, clutches, roadway paving etc. and also from re-whirling of road dust.

It has become evident that emissions of such a type, in particular of particles generated at the boundary surface between the vehicle wheel and the roadway, increase disproportionately with the speed of travel, and as described herein the collection of dust is only active when a preset minimum speed, or a minimum speed established in a manner depending on further parameters, is exceeded.

There are various possibilities for designing the air-conducting structure in such a way that primarily those dusts which are emitted or whirled up by the motor vehicle itself during a run are collected and supplied to the dust collector.

In one embodiment, the air-conducting structure is an air-conducting plate in flow communication with the wheel housing of the vehicle wheel, and the dust collector is arranged in the wheel housing. In this case, the air-conducting plate—which, regardless of its designation, may of course also consist of materials other than metal, for example of plastic—may in the simplest form be a type of continuation of the rear wheel housing in the downward direction, similar to a mud-flap but capable of being retracted into the wheel housing. But the air-conducting plate may also surround the vehicle wheel more completely, even taking the form of a type of wheel fairing which substantially encapsulates the vehicle wheel completely, except for a gap toward the roadway surface.

In a preferred further development of the aforementioned embodiments, the dust collector is an electrical separator which is substantially effective within the entire wheel housing and which can be accommodated therein in a particularly advantageous manner. An electrical separator, also called an electrostatic filter or ESP (electrostatic precipitator), enables the separation of particles from gases by means of electrostatic fields in which dust particles are charged and transported to a precipitating electrode to which they adhere electrostatically and from which they can be removed, see https://de.wikipedia.org/wiki/Elektrofilter In another embodiment of the invention, the air-conducting structure is a duct which terminates in the wake of the rear end of the vehicle and in which the dust collector is arranged. In this case, the dust collector may be a filter, a centrifugal separator or an electrical separator, in particular for fine dust.

The dust collector may also be effective as a filter or separator for gaseous emissions that stem from a vehicle brake assigned to the vehicle wheel and/or from the interaction between the vehicle wheel and the roadway surface.

The device for automatic adjustment of the spacing between the air-conducting structure and the roadway surface may have been set up to adjust the spacing also in a manner depending on one or more parameters other than the speed of travel, in order to collect the dusts emitted or whirled up by the motor vehicle itself still more selectively.

Appropriate further parameters may be, or encompass, the acceleration and/or deceleration of the vehicle or of individual vehicle wheels. In the course of greater acceleration, a relatively large amount of tire abrasion and roadway abrasion arises, and brake dust is additionally emitted in the course of braking.

Appropriate further parameters may also be, or encompass, vehicle-suspension data, in particular with regard to the current spring compression of all the vehicle wheels or of individual vehicle wheels.

Appropriate further parameters may also be, or encompass, meteorological data, in particular temperature and humidity of the ambient air, and/or precipitation data. For instance, in a humid and/or cool environment less whirling-up of dust is to be reckoned with, and under such conditions the dust collector can be relieved and is also not impaired by humidity.

Appropriate further parameters may also encompass observation data pertaining to a part of the roadway surface situated ahead of the vehicle in the direction of travel, and/or map data that indicate the dust loading and/or the type of the roadway surface being driven over. The roadway surface can be observed with a camera and/or with a laser scanner and/or with a radar system of the vehicle, in order to acquire images of the roadway surface in any region of the electromagnetic spectrum, such as, for example, visible or invisible light or radar waves. On the basis of these images or similar observation data pertaining to the roadway surface, acquired by sensory means, it can be estimated automatically in the vehicle in real time how great the road-dust loading is of the part of the roadway surface situated ahead of the vehicle, and/or whether it is a question of an asphalted or non-asphalted road, to the extent that the latter is not already clear from electronic maps.

Additionally or alternatively, the dust loading prevailing immediately downstream of the vehicle wheel can be measured with a scattered-light photometer, and the air-conducting structure is also lowered or only lowered when it is established by means of the scattered-light photometer that the vehicle is whirling up and/or emitting a relatively large amount of dust.

BRIEF DESCRIPTION OF THE DRAWING FIGURES

Figure 2:
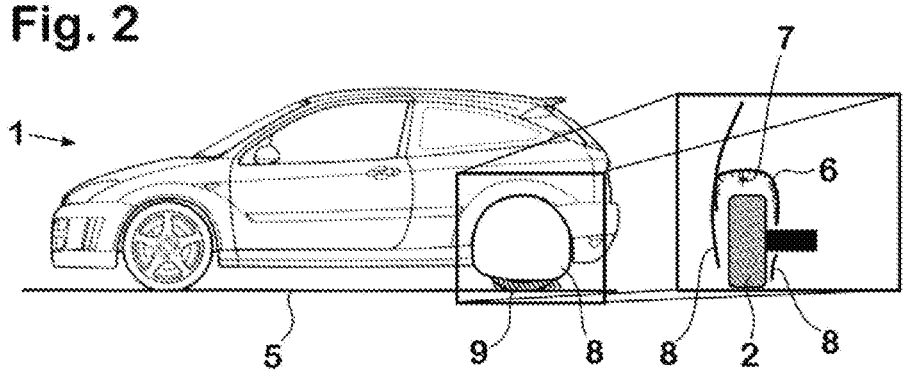
Figure 3:
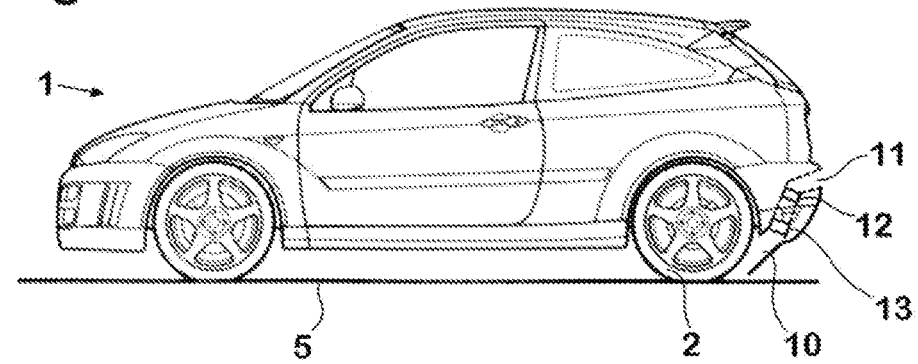
Figure 4:
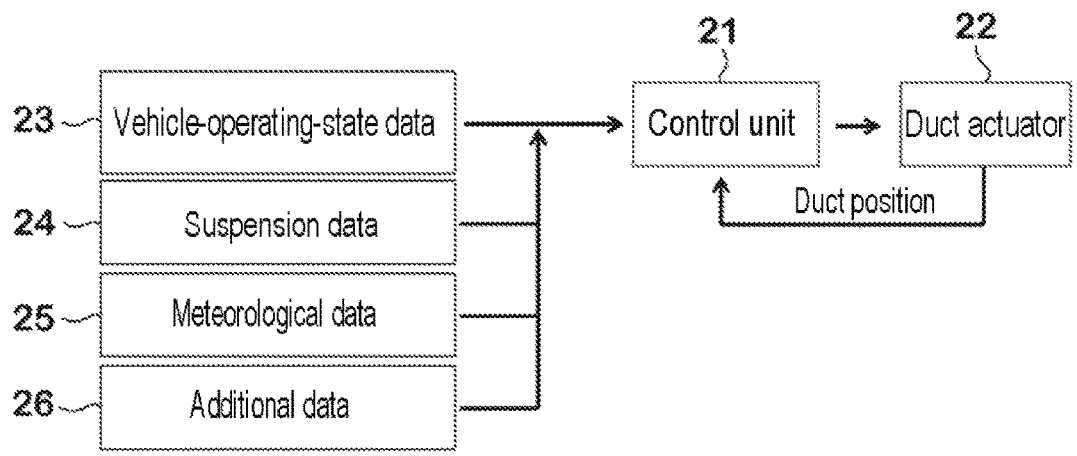
Figure 5:
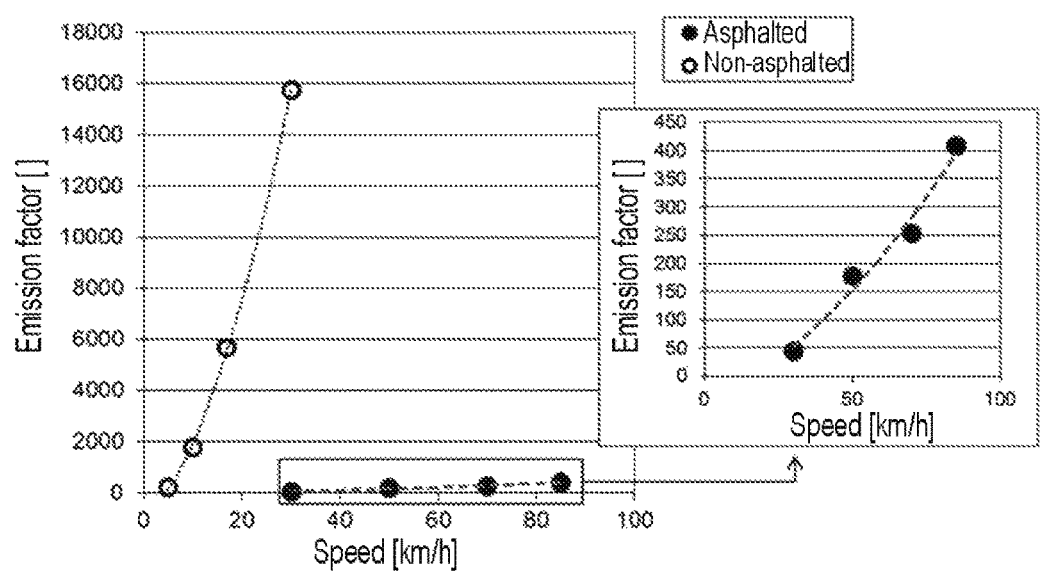

There follows a description of exemplary embodiments with reference to the drawings. Shown therein are:

FIG. 1 to the left, a side view of an automobile and, to the right, a sectional view of a rear wheel and wheel housing of the automobile;

FIG. 2 to the left, a side view of an automobile and, to the right, a sectional view of a rear wheel and wheel housing in another embodiment;

FIG. 3 a partly sectional side view of an automobile, which shows an exemplary embodiment of an alternative air-conducting structure;

FIG. 4 a block diagram of the spacing adjustment as a function of a large number of parameters; and FIG. 5 graphs of the dependence of dust emissions on the speed of travel.

DETAILED DESCRIPTION

The automobile 1 shown in FIG. 1 possesses, downstream of each rear wheel 2, an air-conducting structure for conducting at least some of the air in the wake of the rear wheel 2 to a dust collector. Of course, the front wheels may also, or alternatively, have been equipped correspondingly.

In FIG. 1 the air-conducting structure is an air-conducting plate 4 in airflow communication with the wheel housing 3 of the rear wheel 2. The air-conducting plate 4 is, by means of a preferentially electromotive actuator, not shown, capable of being retracted into the wheel housing 3. FIG. 1 shows the air-conducting plate 4 in a lowered position in which its lower edge has a relatively small spacing from the roadway surface 5. The raising and lowering of the air-conducting plate 4 can take place between two fixed end positions, but there are preferentially also variably selectable intermediate positions.

The air-conducting plate 4 conducts air which is laden with dust that the automobile 1 has emitted or whirled up into the wheel housing 3 during a run. The entire inner surface of the wheel housing 3 takes the form of a precipitating electrode 6. In the space between the rear wheel 2 and the wheel housing 3, a corona-discharge device 7 is arranged which charges electrostatically the dust contained in the air in the wheel housing 3. As a result, the dust is precipitated on the oppositely charged precipitating electrode 6, specifically as a mixture—consisting of brake dust, abraded tire material and other dusts—which has a tendency to remain adhering to the precipitating electrode 6 even when the electrical-separation dust collector constituted by the corona-discharge device 7 and the precipitating electrode 6 is switched off. The layer of dust building up on the precipitating electrode 6 with time can, for example, be removed in the course of workshop maintenance work, to the extent that it is not already washed off in car washes which also have to be equipped with suitable dirt-separators. The dust collector is therefore practically maintenance-free and also environmentally friendly.

The automobile 1 shown in FIG. 2 differs from that shown in FIG. 1 only in that the air-conducting plate is a component of a larger air-conducting structure, namely of a wheel fairing 8 which substantially completely surrounds the rear wheel 2, except for a gap toward the roadway surface 5, which, where appropriate, may also have been sealed with flexible brushes 9. The wheel fairing 8 is also capable of being lowered and raised by means of an actuator, not only for the reasons described in more detail further below, but also in order to avoid ground contact in the course of marshaling trips and, for example, to be able to pass over curbs.

In other respects, the dust-collecting arrangements shown in FIGS. 1 and 2, with an electrical separator utilizing the entire inner surface of the wheel housing 3, have the advantage that they still display a certain dust-collecting action even when the air-conducting plate 4 or the wheel fairing 8 can no longer be lowered, for example on account of a defective actuator, or, for example, is not present at all.

FIG. 3 shows an automobile 1 with a duct 10 by way of air-conducting structure which, just like the air-conducting plate 4 shown in FIG. 1, begins in the wake of the rear wheel 2 but leads to an outlet opening 11 situated in the wake of the rear end of the vehicle. Between the beginning and the end of the duct 10 a pressure-difference builds up aerodynamically during a run, which gives rise to a stream of air through the duct 10. Arranged in the duct 10 is a dust collector 12 which may be a filter, a centrifugal separator or an electrical separator and which is preferentially designed to be maintenance-free or at least low-maintenance.

The stream of air can be brought about or amplified with additional means, for example by a fan 13 installed in the duct 10, and/or by the rim of the rear wheel 2 being designed with fan blades which have a tendency to convey the air located in the region of the rear wheel 2 into the duct 10, where appropriate in interaction with additional lateral air-conducting plates. In each case, as much air as possible is to be conveyed out of the region of the rear wheel 2 through the duct 10, and not directly into the ambient air.

Just as in the preceding exemplary embodiments, the duct 10 shown in FIG. 3 also constitutes an air-conducting structure which is capable of being lowered and raised automatically by means of an actuator, in order to bring its lower front opening into a position having a relatively small spacing from the roadway surface 5 during a faster run.

The exemplary embodiment shown in FIG. 3 is also distinguished by the fact that it can be integrated easily into the rear fender of the automobile 1, in which case the outlet opening 11 may also act as a sporty design element.

FIG. 4 illustrates the adjustment of the spacing of the lower edge of the air-conducting structure—such as, for example, the air-conducting plate 4 or the wheel fairing 8 or the duct 10—as a function of various parameters.

In the simplest variant, a control unit 21 controls a duct actuator 22 in such a manner that the position of the duct depends only on the speed of travel of the automobile 1 and optionally also on the acceleration and/or deceleration thereof. In the case of slow travel, the duct or another air-conducting structure is as far away from the roadway 5 as possible, in order not to interfere in the course of marshaling and parking maneuvers, and it is lowered with increasing speed of travel. The corresponding values can be obtained as operating-state data 23 pertaining to the automobile 1 via a vehicle CAN bus.

Via the CAN bus, suspension data 24 are furthermore obtainable which may likewise enter into the height adjustment in order to maintain a constant spacing from the roadway 5, in order that the air-conducting structure does not rest on the roadway 5 on an uneven roadway or in the case of a low-slung automobile 1.

Via the CAN bus, meteorological data 25—such as, for example, temperature and humidity of the ambient air, and/or precipitation data from a rain sensor installed in the automobile 1—are furthermore obtainable which likewise may have some influence on the height adjustment in order to relieve the dust collector in a humid and/or cool environment in which a collection of dust is rather unnecessary and/or is harmful for the dust collector.

Via the CAN bus, additional data 26 are obtainable, namely observation data pertaining to a part of the roadway surface situated ahead of the vehicle in the direction of travel, and/or map data that indicate the dust loading and/or the type of the roadway surface being driven over.

FIG. 5 shows empirically acquired graphs of the dependence of dust emissions on the speed of travel and on the condition of the roadway, namely on whether or not the roadway is asphalted or concreted. It will be discerned that dust emissions increase disproportionately with the speed of travel, and that they are many times higher on a non-asphalted roadway than on an asphalted roadway. Therefore, for example, an exemplary embodiment may also be sensible in which the position of the duct depends only on the speed and on the condition of the road.

The invention claimed is:

1. A motor vehicle comprising:
   a dust collector;
   at least one air-conducting structure, downstream of a wheel of said motor vehicle, conducting at least some air from a wake of said wheel to said dust collector; and
   a control unit and a duct actuator configured to adjust a position of said at least one air-conducting structure in response to at least one of (a) speed of travel of the motor vehicle and (b) spacing between a lower edge of said at least one air-conducting structure and a roadway surface being driven over by the motor vehicle.

2. The motor vehicle of claim 1 wherein said at least one air-conducting structure is configured to collect and supply to said dust collector primarily dusts that are emitted or whirled up by the motor vehicle during a run.

3. The motor vehicle as claimed in claim 2, wherein the at least one air-conducting structure is an air-conducting plate in flow communication with a wheel housing of the wheel and wherein the dust collector is arranged in the wheel housing.

4. The motor vehicle as claimed in claim 3, wherein the air-conducting plate is a component of a wheel fairing which substantially surrounds the wheel.

5. The motor vehicle as claimed in claim 3, wherein the dust collector is an electrical separator which is effective substantially within the wheel housing.

6. The motor vehicle as claimed in claim 1, wherein the at least one air-conducting structure is a duct which terminates in the wake of a rear end of the vehicle and in which the dust collector is arranged.

7. The motor vehicle as claimed in claim 6, wherein the dust collector is selected from a group of devices consisting of a filter, a centrifugal separator and an electrical separator for fine dust.

8. The motor vehicle as claimed in claim 7, wherein the dust collector is also effective as a filter or separator for gaseous emissions that stem from a vehicle brake assigned to the wheel and/or from interaction between the wheel and the roadway surface.

9. The motor vehicle as claimed in claim 7, wherein the control unit and the duct actuator for automatic adjustment of the spacing between the air-conducting structure and the roadway surface is configured to adjust the spacing also in response to acceleration and/or deceleration of the motor vehicle or of an individual vehicle wheel.

10. The motor vehicle as claimed in claim 7, wherein the control unit and the duct actuator for automatic adjustment of the spacing between the air-conducting structure and the roadway surface is configured to adjust the spacing also in response to vehicle suspension data.

11. The motor vehicle as claimed in claim 7, wherein the control unit and the duct actuator for automatic adjustment of the spacing between the air-conducting structure and the roadway surface is configured to adjust the spacing also in response to spring compression data.

12. The motor vehicle as claimed in claim 7, wherein the control unit and the duct actuator for automatic adjustment of the spacing between the air-conducting structure and the roadway surface is configured to adjust the spacing also in response to meteorological data.

13. The motor vehicle as claimed in claim 7, wherein the control unit and the duct actuator for automatic adjustment of the spacing between the air-conducting structure and the roadway surface is configured to adjust the spacing also in response to ambient temperature and humidity data.

14. The motor vehicle as claimed in claim 7, wherein the control unit and the duct actuator for automatic adjustment of the spacing between the air-conducting structure and the roadway surface is configured to adjust the spacing also in response to precipitation data.

15. The motor vehicle as claimed in claim 7, wherein the control unit and the duct actuator for automatic adjustment of the spacing between the air-conducting structure and the roadway surface is configured to adjust the spacing also in response to observation data pertaining to a part of the roadway surface situated ahead of the motor vehicle.

16. The motor vehicle as claimed in claim 7, wherein the control unit and the duct actuator for automatic adjustment of the spacing between the air-conducting structure and the roadway surface is configured to adjust the spacing also in response to map data indicating dust loading and/or type of roadway surface being driven over.

17. A method of dust collection, comprising:
positioning an air-conducting structure in a wake of a wheel of a motor vehicle;
conducting, by said air-conducting structure, dust laden air to a dust collector; and
adjusting, by control unit and duct actuator, a position of said air-conducting structure in response to speed of travel of the motor vehicle.

18. The method of claim 17, further including adjusting, by said control unit and said duct actuator, said position of said air-conducting structure in response to at least one parameter selected from a group of parameters consisting of spacing between a lower edge of said air-conducting structure and a roadway surface being driven over by the motor vehicle, suspension data, spring compression data, meteorological data, ambient temperature data, ambient humidity data, precipitation data, observation data pertaining to a part of a surface of the roadway situated ahead of the motor vehicle and map data indicating dust loading and/or type of roadway surface being driven over.

19. A method of dust collection, comprising:
positioning an air-conducting structure in a wake of a wheel of a motor vehicle;
conducting, by said air-conducting structure, dust laden air to a dust collector; and
adjusting, by control unit and duct actuator, a position of said air-conducting structure in response to spacing between a lower edge of said air-conducting structure and a roadway surface being driven over by the motor vehicle.

20. The method of claim 19, further including adjusting, by said control unit and said duct actuator, said position of said air-conducting structure in response to at least one parameter selected from a group of parameters consisting of speed of travel of the motor vehicle, suspension data, spring compression data, meteorological data, ambient temperature data, ambient humidity data, precipitation data, observation data pertaining to a part of a surface of the roadway situated ahead of the motor vehicle and map data indicating dust loading and/or type of roadway surface being driven over.

\* \* \* \* \*